March 15, 1966 G. K. B. T. GRUNWALDT 3,240,989

TRANSISTORIZED TIMER FOR VEHICLE INDICATOR LAMPS

Filed Oct. 29, 1962

INVENTOR
GOTTFRIED K. B, T. GRUNWALDT
BY
AGENT 3,240,989
TRANSISTORIZED TIMER FOR VEHICLE INDICATOR LAMPS

Gottfried Karl Bernhard Torsten Grunwaldt, Hamburg, Germany, assignor to North American Philips Company, Inc., New York, N.Y., a corporation of Delaware Filed Oct. 29, 1962, Ser. No. 233,668
Claims priority, application Germany, Dec. 29, 1961, P 28,509
5 Claims. (Cl. 315—77)

Figure 1:
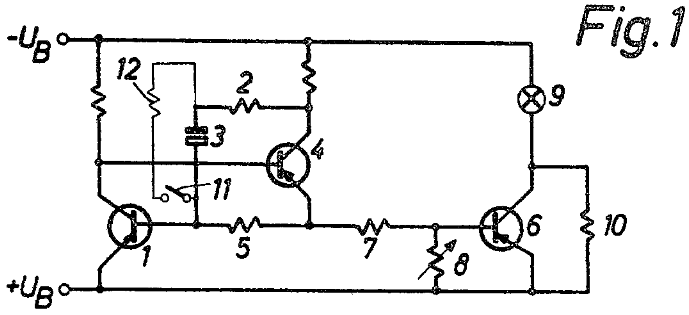

This invention relates to astable multivibrators in which a pair of transistors are included as the active elements.

Astable multivibrators comprising a pair of transistors of the same conductivity type in which one transistor is always conductive while the other is always cut off during operation are known. Such circuit arrangements contain two capacitors which may have different values. In contradistinction thereto, in the astable multivibrator according to the invention the collector and the emitter of one transistor are each connected through a resistor to a respective terminal of the source of voltage supply and two feedback paths are provided from this transistor to the base of the second transistor. The collector and the emitter of the second transistor are connected through resistors to the same respective terminals of said source as the collector and emitter of the first transistor. One of said feedback paths provides a feedback variable with time from the collector of the first transistor via an RC series circuit and the other of said feedback paths is a direct current path through a resistor from the emitter of the first transistor; the collector of the second transistor is directly connected to the base of the first transistor.

The astable multivibrator of this invention is especially distinguished by the fact that it needs only one capacitor; in addition this capacitor may be materially smaller than the larger of the two capacitors of a prior-art asymmetric multivibrator having the same switching capability. For this reason, the astable multivibrator according to invention is particularly suited for use as a timer for blinkers in motor vehicles, in which the frequency is comparatively low and the multivibrator is always required to start oscillating from a predetermined condition when the blinker is operated; this condition is generally a dark half cycle in which the indicator lamps of the blinkers are pre-heated.

Figure 2:
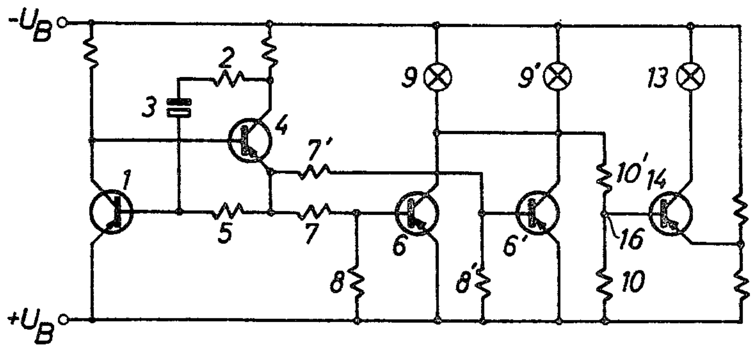
Figure 3:
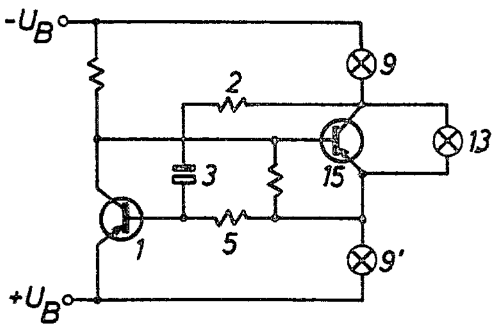

In order that the invention may readily be carried into effect, embodiments thereof will now be described, by way of example, with reference to the accompanying schematic circuit diagrams wherein like reference numerals refer to like elements, and where:

FIGURE 1 shows an embodiment in which the multivibrator circuit is followed by a power transistor, FIGURE 2 shows an embodiment in which the multivibrator circuit is followed by several power transistors, and FIGURE 3 shows a modification of the embodiment of FIGURE 1.

In the embodiment of FIG. 1, the multivibrator comprises a first transistor 1 and a second transistor 4. Feedback to the transistor 1 is accomplished by means of a series circuit comprising a resistor 2 and a capacitor 3 connected between the collector of transistor 4 and the base of transistor 1 and through a resistor 5 connected between the emitter of transistor 4 and the base of transistor 1. The two terminals of a source of supply voltage are shown as $-U_B$ and $+U_B$. When the operating voltage $U_B$ is switched on, base current is supplied to transistor 1 through the capacitor 3; transistor 1 is then overdriven and hence cuts off the transistor 4. This determined initial condition occurs each time the circuit is switched on, provided that the capacitor 3 has previously been sufficiently discharged. After a certain period of time the charging current to the capacitor 3 becomes so weak that the transistor 1 comes out of the overdriven condition and hence renders transistor 4 conductive, as a result of which the feedback between the two transistors becomes operative so that now the transistor 1 is cut off and the transistor 4 is overdriven. The transistor 1 is cut off owing to the fact that the resistor 2 has a lower resistance value than the resistor 5 and the capacitor 3 has been charged. However, from this instant the capacitor 3 is discharged and after a predetermined time the base emitter path of the transistor 1 is again biased in the conductive direction and the multivibrator is caused to change its condition. A power transistor 6, which switches the load, is driven by the multivibrator; this is accomplished by the connection from the right-hand end of resistor 7 to the positive terminal of the operating voltage supply $U_B$ through the base emitter path of the transistor 6. The time during which the transistor 1 is conductive is dependent to some extent upon the current gain and the $I_{CB0}$ leakage current and hence upon the properties of the individual circuit components, aging and temperature. In particular the $I_{CB0}$ leakage current must not increase to a value such that it suffices to overdrive the transistor 1 and hence prevents the circuit from oscillating. Consequently the current gain of the transistor 1 should not be excessively high.

The circuit arrangement operates reliably up to an ambient temperature of about 75° C. and in the entire temperature range it remains within the frequency tolerances permissible in motor-vehicle blinkers. Furthermore the dependence of the multivibrator upon differences in the current gain of different transistors 1 is not so great that the frequency tolerances are exceeded.

The variation in the current gain has a slight influence upon the cut-off or dark period. This influence, however, is not great due to the fact that the base emitter path of transistor 1 is shunted by resistors 5 and 7. It is nevertheless preferable to fix an upper limit for the current gain of the transistor 1 in order to prevent the multivibrator from being rendered permanently inoperative by the leakage current.

In a practical embodiment the current gain of the transistor 1 was restricted to 100; this ensures reliable operation of the circuit under any circumstances which may occur in practice. The use of a silicon transistor for the transistor 1 eliminates all difficulty with respect to the leakage current.

Because the current gain of a transistor may change comparatively greatly during its life while the $I_c/U_{BE}$ characteristic does not change in the same proportion, it is of advantage, for example with lamp switching systems including power transistors to limit the collector current by shunting the base emitter path of the transistor 6 by an adjustable resistor 8, so that the drive of the transistor approximates a voltage control.

Pre-heating and intermediate heating of the load, shown in FIG. 1 as an indicator lamp 9, is effected through a resistor 10. Since the multivibrator always starts with the dark or cut-off half cycle (provided that the capacitor 3 has previously been discharged), a critical case can occur, for example with direction indicators which must be capable of being switched over immediately from left to right. In this event the transistor 6 may immediately be connected in series with a cold lamp. To avoid this difficulty the capacitor 3 can be short-circuited through a resistor 12 of low value with the aid of a contact 11 (FIG. 1) which may be for example an additional contact of the direction indicator switch of the direction indicator, which contact is always closed in the neutral or rest position and open in all other positions. Thus, the capacitor 3 is discharged in a very short time whenever the neutral switch position is reached, which ensures that operation always starts with a dark half cycle. This measure may also be applied in the circuit arrangements described hereinafter.

In the circuit arrangement shown in FIG. 2, two indicator lamps 9 and 9' of blinkers and a control lamp 13 are operated. The steady current of the indicator lamps 9 and 9' in this circuit arrangement is about 4.8 amperes and their peak current when periodically switched on again is 6.5 amperes. When the circuit is first switched on after a dark half cycle enabling preheating, the current may reach about 18 amperes if not limited by the transistors 6 and 6'. The pre-heating resistor is constituted by resistor 10 ond 10' and control lamp 13 is controlled from a tap 16 on the pre-heating resistor. The control lamp 13 is always lit when the indicator lamps 9 and 9' are switched off. When one of the indicator lamps becomes defective, the voltage at the base of the control transistor 14 is changed. The control lamp 13 then receives so weak a current that it is no longer lit.

A higher operating voltage $U_B$ of, for example, 12 volts provides the advantage that the currents and hence the transistor currents are halved. The capacitor 3 of the timer may then also be smaller.

In the circuit arrangement shown in FIGURE 3 the power transistor 15 which switches the indicator lamps 9 and 9' also constitutes part of the multivibrator, which serves as the timer. This timer can operate only if both indicator lamps 9 and 9' are in order. Hence the control lamp 13 need not respond to the current consumption of the indicator lamps but only to indicate the oscillating condition of the multivibrator. This circuit arrangement permits the elimination of a lamp-driving control transistor but it requires a comparatively large electrolytic capacitor as the series capacitor 3.

While the invention has been described in connection with preferred embodiments, it is understood that many modifications thereof will be obvious to those skilled in the art without departing from the inventive concept, the scope of which is set forth in the appended claims.

What is claimed is:

1. An astable multivibrator comprising a pair of transistors of the same conductivity type, one transistor being always conductive and the other cut off during operation, two terminals adapted to be connected to differently poled outputs, respectively, of a source of voltage supply, the collector and the emitter of a first transistor each being respectively connected through a resistor to a different one of said terminals, a first feedback path from the collector of said first transistor to the base of said second transistor, a second feedback path from the emitter of said first transistor to the base of said second transistor, said first feedback path comprising an RC series circuit and providing a feedback variable with time, said second feedback path being a direct current conductive connection including resistive means, the collector of said second transistor being directly connected to the base of said first transistor and to the same terminal as the collector of said first transistor through a resistor, the emitter of said second transistor being connected to the same terminal as the emitter of said first transistor.

2. An astable multivibrator as claimed in claim 1, wherein said first transistor is a power transistor and the emitter and collector resistors of said first transistor are the load resistors of the multivibrator and are constituted by filament lamps.

3. A timer for the indicator lamps of a direction indicating blinker of a motor vehicle including: an astable multivibrator comprising a pair of transistors of the same conductivity type, one transistor being always conductive and the other cut off during operation, two terminals adapted to be connected to differently poled outputs, respectively, of a source of voltage supply, the collector and the emitter of a first transistor each being respectivey connected through a resistor to a different one of said terminals, a first feedback path from the collector of said first transistor to the base of the second transistor, a second feedback path from the emitter of said first transistor to the base of said second transistor, said first feedback path comprising an R.C. series circuit and providing a feedback variable with time, said second feedback path being a direct current conductive connection including resistive means, the collector of said second transistor being directly connected to the base of said first transistor and to the same terminal as the collector of said first transistor through a resistor, the emitter of said second transistor being connected to the same terminal as the emitter of said first transistor, at least one power transistor B, circuit means coupling said power transistor to said multivibrator for driving said power transistor by said multivibrator, means for coupling an indicator lamp to each power transistor, and means connecting a resistor in parallel with said power transistors for pre-heating said indicator lamps.

4. A timer as claimed in claim 3, further comprising an additional resistor connected across the capacitor of the R.C. series circuit for discharging said capacitor, and a switch connected in series with said additional resistor.

5. A timer for the indicator lamps of a direction indicating blinker of a motor vehicle including: an astable multivibrator comprising a pair of transistors of the same conductivity type, one transistor being always conductive and the other cut off during operation, two terminals adapted to be connected to differently poled outputs, respectively, of a source of voltage supply, the collector and the emitter of a first transistor each being respectively connected through a resistor to a different one of said terminals, a first feedback path from the collector of said first transistor to the base of the second transistor, a second feedback path from the emitter of said first transistor to the base of said second transistor, said first feedback path comprising an R.C. series circuit and providing a feedback variable with time, said second feedback path being a direct current conductive connection including resistive means, the collector of said second transistor being directly connected to the base of said first transistor and to the same terminal as the collector of said first transistor through a resistor, the emitter of said second transistor being connected to the same terminal as the emitter of said first transistor, a plurality of power transistors, circuit means coupling said power transistors to said multivibrator for driving said power transistors by said multivibrator, means for coupling an indicator lamp to each power transistor, a pre-heating resistor connected in parallel with said power transistors for pre-heating said indicator lamps, and a control lamp coupled to one of said power transistors, said control lamp being supplied with energizing current responsive to the voltage drop across said pre-heating resistor.

References Cited by the Examiner

UNITED STATES PATENTS

| | | | |
|---|---|---|---|
| 1,829,257 | 4/1958 | Root | 331—111 |
| 3,018,473 | 1/1962 | Dodgers | 331—111 |
| 3,022,467 | 2/1962 | Leeder | 307—88.5/2.3 X |
| 3,046,494 | 7/1962 | Root | 315—136 X |
| 3,054,970 | 9/1962 | Lace | 331—111 |

GEORGE N. WESTBY, *Primary Examiner*.